United States Patent [19]

Parton

[11] 4,113,717
[45] Sep. 12, 1978

[54] QUATERNIZED AZO DYESTUFFS
[75] Inventor: Brian Parton, Manchester, England
[73] Assignee: Imperial Chemical Industries Limited, London, England
[21] Appl. No.: 648,568
[22] Filed: Jan. 12, 1976
[30] Foreign Application Priority Data
  Jan. 23, 1975 [GB] United Kingdom ............ 2990/75
[51] Int. Cl.$^2$ .............................. C09B 43/00
[52] U.S. Cl. ..................... 260/146 R; 260/146 D; 260/147; 260/154; 260/155; 260/208
[58] Field of Search ................... 260/155, 146 R
[56] References Cited

U.S. PATENT DOCUMENTS 3,332,930  7/1967  Mohr et al. ................. 260/155 X
3,542,758  11/1970  Hegar ........................ 260/155 X

FOREIGN PATENT DOCUMENTS 791,932  3/1958  United Kingdom ........... 260/157

*Primary Examiner*—Charles F. Warren
*Attorney, Agent, or Firm*—Cushman, Darby & Cushman

[57] ABSTRACT

Azo dyestuffs devoid of carboxylic acid and sulphonic acid groups and of the formula I:

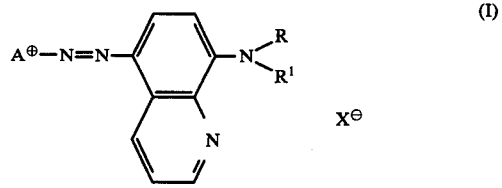

wherein $A^{\oplus}$ is a positively-charged aromatic or heterocyclic group, $X^{\ominus}$ is an anion; R is hydrogen or an optionally-substituted alkyl, aryl, aralkyl or cycloalkyl group, $R^1$ is hydrogen, or an optionally-substituted alkyl or aralkyl group and the quinoline ring may be further substituted, and processes for the manufacture of such dyestuffs which are useful for the coloration of synthetic polymeric materials such as acrylonitrile polymers and copolymers.

2 Claims, No Drawings

QUATERNIZED AZO DYESTUFFS

This invention relates to new water-soluble azo dyestuffs, to their manufacture and to the use of such dyestuffs for the colouration of synthetic polymeric materials in the form of ribbons, tapes, fibres, films, threads and textile materials generally. The dyestuffs are particularly valuable for the colouration of polymers and copolymers of acrylonitrile and of dicyanoethylene and also acid-modified polyesters and polyamides.

According to the present invention, there is provided azo dyestuffs devoid of carboxylic acid and sulphonic acid groups and of the formula I:

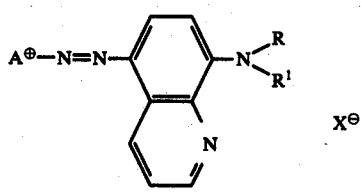

wherein $A^\oplus$ is a positively-charged aromatic or heterocyclic group, $X^\ominus$ is an anion; R is hydrogen or an optionally-substituted alkyl, aryl, aralkyl or cycloalkyl group, $R^1$ is hydrogen, or an optionally-substituted alkyl or aralkyl group and the quinoline ring may be further substituted.

The group $A^\oplus$ may be an aromatic carbocyclic or heterocyclic group having a pendant cationic group attached to the aromatic or heterocyclic ring.

Examples of such aromatic rings include the benzene and naphthalene rings and examples of heterocyclic rings include the quinoline, furan, thiophene, pyrrole, indole, carbazole, pyridine, isoquinoline and quinoxaline rings.

The aromatic carbocyclic or heterocyclic ring may carry substituents such as alkyl, cycloalkyl, aralkyl, alkoxy, aralkoxy, aryl, alkoxycarbonyl, acyloxy, arylazo, acylamino, carbamoyl, sulphamyl, alkylsulphonyl, alkylmercapto, aralkylmercapto, dialkylamino, nitro, cyano and trifluoromethyl groups and halogen atoms.

Examples of specific substituents include chlorine, bromine, trifluoromethyl, cyano, nitro, hydroxy, acetamido, formamido, aminosulphonyl and mono- and di-lower alkyl aminosulphonyl groups, phenylaminosulphonyl, aminocarbonyl, ethylaminocarbonyl, methoxy, ethoxy, phenoxy, methylsulphonyl, ethylsulphonyl, phenylsulphonyl, β-hydroxyethoxy, β-chloroethoxy, β-methoxyethoxy, methoxycarbonyl, ethoxycarbonyl, cyclohexyloxycarbonyl, phenyl, phenylamino, cyclohexylamino, benzyl and phenylthio.

Examples of pendant cationic groups which may be attached to an aromatic carbocyclic or heterocyclic group A include:

—$SO_2$—NH—$CH_2$—$CH_2$—$Py^+$, —CO—$CH_2$—$Py^+$, —NH—CO—$CH_2$—$Py^+$,
—CO—NH—$CH_2$—$CH_2$—$CH_2$—$N^+$—$(CH_3)_3$,
—CO—O—$CH_2$—$CH_2$—N—$(CH_3)_3$,
—O—$CH_2$—$CH_2$—O—CO—$CH_2$—$CH_2$—$Py^+$,
—NH—CO—$CH_2$—$S^+$—$(C_2H_5)_2$,
—CO—$CH_2$—$S^+$—$(CH_2$—$CH_2OH)_2$, —O—$CH_2$—$CH_2$—$S^+$—$(CH_3)$—$C_2H_5$,
—CO—$CH_2$—$S^+$—$(CH_3)$—$C_2H_5$, —CO—$CH_2$—$S^+$=C—$(NH_2)_2$,
—O—$CH_2$—$CH_2$—$S^+$=C—[N—$(CH_3)_2]_2$, —NH—CO—$CH_2$—$S^+$—$(CH_3)$—$C_2H_5$,

—NH—CH=$\overset{+}{N}$—$(CH_3)_2$, O=$\overset{+}{C}$—NH—$CH_2$—Py,

Ph—$\overset{+}{N}$—CO—$CH_2$—Py,

—NH—CO—$V^+$, —O—$CH_2$—$CH_2$—O—CO—$V^+$,
—CH=N—$N^+$—$(CH_3)_2$, —NH—CO—CH=N—$N^+$—$(CH_3)_3$,
—O—$CH_2$—$CH_2$—$N^+$—$(NH_2)$—$(CH_3)_2$, —$SO_2$—NH—$CH_2$—$CH_2$—$CH_2$—$N^+$—$(NH_2)$—$(CH_3)_2$,
—$SO_2$—$CH_2$—$CH_2$—$N^+$—$(NH_2)$—$(CH_3)_2$,
—CO—O—$CH_2$—$CH_2$—$N^+$—$(NH_2)$—$(CH_3)_2$,
—O—$CH_2$—$CH_2$—O—CO—$CH_2N^+$—$(NH_2)$—$(CH_3)_2$, —$CH_2$—$CH_2$—$N^+$—$(NH_2)$—$(CH_3)_2$,
—NH—CO—$CH_2$—$N^+$—$(NH_2)$—$(CH_3)_2$, —$CH_2$—$N^+$—$(NH_2)$—$(CH_3)_2$,
—$CH_2$—NH—CO—$CH_2N$—$(NH_2)$—$(CH_3)_2$,
—CO—$CH_2CH_2$—$N^+$—$(CH_3)_3$,
—$SO_2$—NH—$N^+$—$(CH_3)_3$, —CO—NH—$N^+$—$(CH_3)_3$, —O—$CH_2$—$CH_2$—$N^+$—$(CH_3)_3$,
—S—$CH_2$—$CH_2$—$N^+$—$(CH_3)_3$, —O—$CH_2$—$CH_2$—$N^+$—$(NH_2)$—$(CH_3)_2$, —S—$CH_2$—$CH_2$—$N^+$—$(NH_2)$—$(CH_3)_2$,
—CO—$CH_2$—$N^+$—$(CH_3)_3$, —NH—CO—$CH_2$—$N^+$—$(CH_3)_3$, —CO—$CH_2$—$P^+$—$(CH_3)_2$—Ph,
—$CH_2$—$P^+$—$(C_4H_9)_3$, —CO—$CH_2$—$P^+$—$(C_4H_9)_3$, —O—$CH_2$—$CH_2$—$P^+$—$(C_4H_9)_3$,
—$SO_2$—$CH_2$—$CH_2P^+$—$(C_4H_9)_3$, —CO—O—$CH_2$—$CH_2$—$P^+$—$(C_4H_9)_3$, —$CH_2Py^+$,
—$CH_2$—$CH_2$—$N^+$—$(CH_3)_3$, —O—$CH_2$—$CH_2$—$Py^+$, —CO—$CH_2$—$W^+$, —NH—CO—$CH_2$—$W^+$,
—CO—$CH_2$—$D^+$, —NH—CO—$CH_2$—$D^+$, —$CH_2$—$D^+$, —O—$CH_2$—$CH_2$—$OCH_2$—$CH_2$—$G^+$,
—$SO_2$—NH—$CH_2$—$CH_2$—$V^+$, —$SO_2$—NH—$CH_2$—$CH_2$—$G^+$, —$SO_2$—NH—$CH_2$—$CH_2$—$W^+$,
—CO—$Ch_2$—$M^+$, —NH—CO—$CH_2$—$M^+$, —$SO_2$—NH—$CH_2$—$CH_2$—$M^+$, —$CH_2$—$M^+$, phenylazo, 3-trimethylammoniumphenylazo, 4-pyridiniumacetyl-phenylazo, 4-pyridiniumacetylaminophenylazo, 3-trimethylammoniumphenylcarbamoyl, 3-trimethylammoniumphenylsulphamyl, and imidazolinylthioethoxy.

In the foregoing radicals the symbols Ph stand for the phenyl radical, $Py^+$ for the pyridinium radical, CyPh for the cyclohexyl radical, $M^+$ for the quinolinium radical, $V^+$ stands for the 1-methyl-3-pyridinium radical, $W^+$ stands for the 4-N,N-dimethylaminopyridinium radical, $D^+$ stands for the 2-methylpyridinium radical and $G^+$ stands for the 1-methyl-4-pyridinium radical.

As further examples of cationic groups which may be carried pendant to an aromatic carbocyclic or heterocyclic ring A there may be mentioned protonated primary, secondary or tertiary amino groups, and quaternary ammonium, cyclammonium, hydrazinium, sulphonium, isothiouronium groups, etherified hydroxylammonium and phosphonium groups which may be associated with any anion Z.

As quaternary ammonium groups there are meant groups of the formula —$N^+R^3R^4R^5$ wherein $R^3$, $R^4$ and $R^5$ each represent an alkyl or cycloalkyl group or substituted derivative thereof wherein 2 only of the groups represented by $R^3$, $R^4$ and $R^5$ together with the nitrogen atom of the quanternary ammonium group form a ring system. As alkyl or substituted alkyl groups which may be represented by $R^3$, $R^4$ and $R^5$ there may be mentioned, for example, particularly methyl, but also ethyl, β-hydroxyethyl and benzyl.

As ring systems which may be formed from 2 only of $R^3$, $R^4$ and $R^5$ together with the nitrogen atom there may be mentioned piperidine and morpholine (as in piperidinium and morpholinium quaternary salts). The remaining group of $R^3$, $R^4$ or $R^5$ will represent an alkyl or substituted alkyl group as described above.

As cyclammonium groups there are meant heterocyclic systems containing in the ring a quaterinised nitrogen atom preferably through which the ring is attached to the remainder of the molecule, for example N-methylpiperidinium and N-methyl-morpholinium, but particularly aromatic heterocyclic systems such as pyridinium, quinolinium, isoquinolinium, and including heterocyclic systems containing heteroatoms additional to the quaternised nitrogen atom and substituted derivatives of the foregoing.

As sulphonium groups there are meant groups of the formula:

wherein $R^6$ stands for an alkyl or substituted alkyl radical such as methyl or ethyl, $R^7$ stands for an alkyl or substituted alkyl radical such as methyl, ethyl and β-hydroxyethyl, a cycloalkyl radical such as cyclohexyl, and aralkyl radical such as benzyl and an aryl radical such as phenyl and p-tolyl.

As isothiouronium groups there are meant groups which in one of their resonating forms may be represented by the formula:

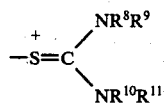

wherein $R^8$, $R^9$, $R^{10}$ and $R^{11}$ represent hydrogen atoms or hydrocarbon or substituted hydrocarbon radicals or $R^8$ and $R^{10}$ may together form an alkylene radical.

As examples of hydrocarbon and substituted hydrocarbon radicals which may be represented by $R^8$, $R^9$, $R^{10}$ and $R^{11}$ there may be mentioned alkyl radicals such as methyl and ethyl, substituted alkyl radicals such as β-hydroxyethyl, cycloalkyl radicals such as cyclohexyl, aralkyl radicals such as benzyl and aryl radicals such as phenyl and p-tolyl. As an example of an alkylene radical which may be formed by $R^8$ and $R^{10}$ together there may be mentioned ethylene. In this case an imidazoline ring is formed.

As hydrazinium groups there are meant groups of the formula $-N^+R^{12}R^{13}-NR^{14}R^{15}$ wherein $R^{12}$ represents an optionally-substituted alkyl, cycloalkyl, aralkyl or phenyl radical or together with $R^{13}$ and the adjacent nitrogen atom of heterocyclic system.

$R^{13}$ represents an optionally-substituted alkyl, cycloalkyl, aralkyl or phenyl radical or together with $R^{12}$ and the adjacent nitrogen atom a heterocyclic system.

$R^{14}$ represents a hydrogen atom or an optionally-substituted alkyl radical or an acyl radical which may form a ring with $R^{15}$ and N, or when $R^{12}$ and $R^{13}$ are other than phenyl, a phenyl radical.

$R^{15}$ represents a hydrogen atom or an optionally-substituted alkyl radical or an acyl radical.

As phosphonium groups there are meant groups of the formula:

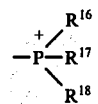

wherein $R^{16}$, $R^{17}$ and $R^{18}$ are organic radicals, which may be the same or different, each having a carbon atom linked directly to the phosphorus atom. As examples of organic radicals which may be represented by $R^{16}$, $R^{17}$ and $R^{18}$ there may be mentioned aliphatic radicals, for example, methyl, ethyl, propyl, butyl, allyl, chloromethyl, hydroxymethyl and β-hydroxyethyl, aromatic radicals, for example, phenyl, naphthyl, p-tolyl, p-chlorophenyl, aralkyl radicals, for example, benzyl and heterocyclic radicals, for example, -2-thienyl.

$A^\oplus$ may also be a heterocyclic group having a positive charge on one of the hetero atoms of the heterocyclic ring, for example, A may contain a cyclammonium group.

Examples of $A^\oplus$ wherein there is a positive charge on one of the hetero atoms of the heterocyclic ring include:

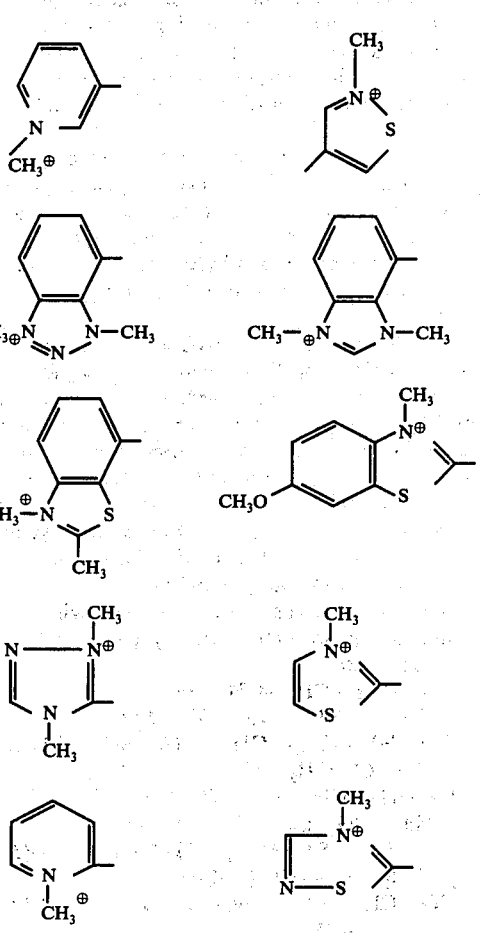

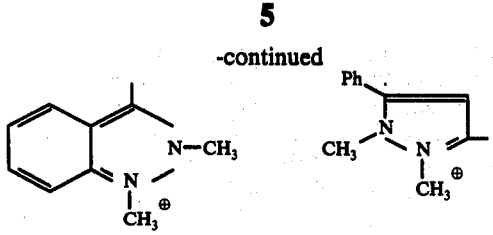 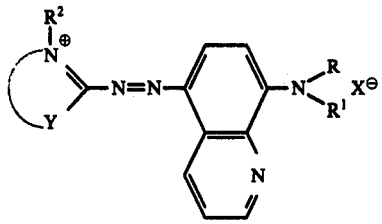

Any of the above rings may be substituted with the non-cationic group-containing substituents which have been listed hereinbefore.

Although in all the above heterocyclic ring structures the quaternising radical has been depicted as methyl, this is purely for the purpose of illustration. In place of the methyl group as quaternising radical there may be present any optionally-substituted alkyl or aralkyl radical.

Examples of such quaternising radicals include methyl, ethyl, propyl, butyl, 2-chloroethyl, 2-bromoethyl, 2-acetoxyethyl, allyl, benzyl, cyclohexyl, 2-phenylethyl, 2-carbamoylethyl, 2-carbamoyl-2-methylethyl, methoxyethyl, methylcarbonylethyl, 2-hydroxyethyl, 2-cyanoethyl and 2-carbamylethyl.

The quinoline ring in Formula I may be further substituted, for example there may be present as substituents, alkyl groups such as methyl, ethyl, propyl and butyl, halogen atoms such as chlorine or bromine, alkoxy such as methoxy, ethoxy and phenoxy, hydroxy, nitro, amino, and acylamino such as formamido, acetylamino and propionylamino.

R may be hydrogen or an optionally-substituted alkyl, aryl, aralkyl or cycloalkyl group.

Examples of R include hydrogen, alkyl such as methyl, ethyl, n-propyl, isopropyl, n-butyl, n-hexyl, cycloalkyl such as cyclohexyl, aralkyl such as benzyl and ring-substituted benzyl groups, aryl such as phenyl, o, m and p-tolyl, o and p-methoxyphenyl, p-dialkylaminophenyl, o, m and p-nitrophenyl, o and p-chlorophenyl, o and p-alkoxycarbonylphenyl, o and p-acyloxyphenyl, o, m and p-acylaminophenyl, substituted alkyl such as 2-chloroethyl, 2-acetoxyethyl, 2-hydroxyethyl, 2-cyanoethyl, 2-carbamylethyl and unsaturated radicals such as allyl.

Examples of $R^1$ include hydrogen, alkyl groups such as methyl, ethyl, n-propyl, isopropyl, n-butyl and n-hexyl, aralkyl groups such as benzyl and ring-substituted benzyl groups, cycloalkyl such as cyclohexyl, substituted alkyl such as 2-chloroethyl, 2-acetoxyethyl, 2-hydroxyethyl, 2-cyanoethyl, 2-carbamylethyl and alkenyl such as allyl.

As anions represented by X there may be mentioned, for example, anions of inorganic acids such as chloride, bromide, tetrachlorozincate, bisulphate, sulphate, tetrafluoroborate, sulphamate, nitrate, phosphate and fluoride and anions of organic acids such as methosulphate, ethosulphate, methyl sulphonate, p-tolyl sulphonate, acetate, oxalate, hydrogen oxalate and formate. In those cases where the anion is polyvalent the water-soluble dyestuffs will contain a corresponding molar proportion of the cationic part of the dyestuff.

A preferred class of dyestuffs of the present invention is that class wherein A is a heterocyclic group containing a quaternised ring nitrogen atom, i.e. a cyclammonium group in conjugation with the chromophore.

This class of dyestuff has the general formula II:

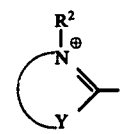

wherein R and $R^1$ are as hereinbefore defined, $R^2$ is a quaternising radical which is an optionally-substituted alkyl or aralkyl group, Y is the remainder of the quaternized heterocyclic group, and X represents the anion of the quaternised heterocyclic group.

Examples of the group:

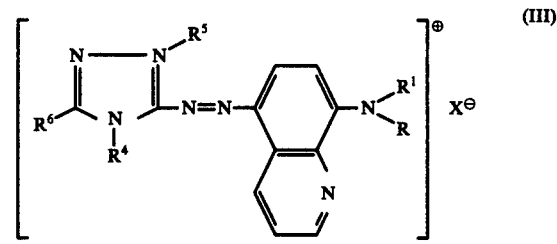

include triazolium, particularly 1,2,4-triazolium, benxthiazolium, benzimidazolium, thiadiazolium, pyrazolium thiazolium and pyridinium.

A particularly preferred class of dyestuffs is that class wherein the group A is a 1,2,4-triazolium residue, for example those dyestuffs of the formula III:

wherein R and $R^1$ are as hereinbefore defined, $R^4$ and $R^5$ are optionally-substituted alkyl or aralkyl radicals and $R^6$ is hydrogen or an optionally-substituted aryl, alkyl or aralkyl group.

Examples of $R^4$ and $R^5$ are the quaternising radicals listed hereinbefore.

Examples of $R^6$ include hydrogen, methyl, ethyl, benzyl, phenyl, p-nitrophenyl, m-tolyl, cyclohexyl, p-chlorophenyl, p-methoxyphenyl, methylthio, methoxy, methoxycarbonyl and aminocarbonyl, Particularly preferred dyestuffs of Formulae II and III are those wherein $R^1$ is hydrogen.

Particularly preferred are also those dyestuffs wherein R represent an alkyl or substituted alkyl group of from 1 to 6 carbon atoms.

Certain of the dyestuffs of this invention can exist in a number of isomeric forms depending on which nitrogen atoms carry the quaternary substituents, for example the triazolium dyestuffs; for convenience the dyestuffs have only been formulated in one of these forms but it is to be understood that this specification includes within its scope the dyestuffs in any of the possible isomeric forms.

Where the term lower alkyl or lower alkoxy is used in this specification it means an alkyl or alkoxy group respectively having from 1 to 4 carbon atoms.

When the dyestuffs of the present invention have a group $A^{61}$ which is a heterocyclic group having a positive charge on one of the hetero atoms of the heterocyclic ring, a preferred method of manufacture of such compounds is by alkylation of a compound of the formula:

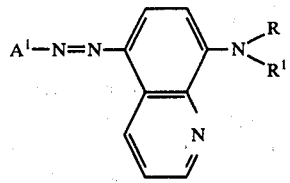
(IV)

wherein R and $R^1$ are as hereinbefore defined and $A^1$ is heterocyclic residue containing at least one unquaternised nitrogen atom.

As examples of alkylating agents there may be mentioned alkyl halides such as methyl, ethyl, propyl and butyl chlorides and the corresponding bromides, alkenyl halides such as allyl chloride or bromide, aralkyl halides such as benzyl chloride or bromide, dialkyl sulphates such as dimethyl sulphate, diethyl sulphate, dipropyl sulphate and dibutyl sulphate, alkyl esters of aryl sulphonates such as methyl and ethyl p-toluene sulphonate and other lower alkyl esters of strong mineral acids or organic sulphonates. Other alkylating agents may themselves carry substituents, for example chloropropionitrile, bromopropionamide and bromohydrin.

The reaction between the alkylating/quaternising agent and dyestuff of formula IV may be carried out neat without addition of other solvents, or again may be carried out in an inert organic solvent such as benzene, toluene, xylene, chlorobenzene, nitrobenzene, aceton, carbontetrachloride, tetrachloroethane, perchloroethylene, chloroform, dimethylformamide, acetonitrile, acetic acid, formic acid or 2-ethoxyethanol. The alkylation may also be effected in aqueous phase optionally in the presence of an organic solvent. The alkylating agent may be used in considerably excess, for example up to 6 moles for each mole of dyestuff. Suitable temperatures are from 20° to 150° C and particularly 20°–90° C. The inclusion of an acid binding agent is often beneficial. Such agents include magnesium oxide, sodium and potassium carbonate, sodium and potassium bicarbonate, magnesium and calcium carbonate, potassium acetate or mixtures of such agents.

Alkylation may also be carried out by reacting with, for example, acrylamide in an organic or mineral acid such as acetic, formic or hydrochloric acid or mixtures of these at between 50° and 100° C.

Alkylation may also be carried out by reacting with ethylene oxide or its derivatives of formula:

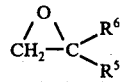

wherein $R_5$ and $R_6$ represent hydrogen or an optionally substituted lower alkyl group.

This reaction is carried out in a solvent in the presence of a mineral or organic acid which provides the anion X, at temperatures of 10° to 100° C and preferably 40°–90° C. Suitable acids include sulphuric, hydrochloric, hydrobromic, phosphoric, benzenesulphonic, toluenslphonic, formic, acetic or propionic. Such acids may also serve as solvent or may be used in admixture with each other or with other organic solvent such as dimethylformamide, acetonitrile, dioxan, tetrahydrofuran, chlorbenzene, toluene, xylene, nitrobenzene, acetone or methylethylketone.

When the reaction is effected in hydrophobic organic solvents the alkylated dyestuff is normally insoluble and may be isolated by filtration. If desired, the alkylated dyestuff may be isolated from aqueous solution by precipitation in the form of a salt such as tetrachlorozincate obtained by adding zinc chloride to the aqueous solution.

As a result of the alkylation the dyestuff may be obtained for example in the form of the chloride, bromide or methosulphate according to the alkylating agent used. If the dysstuff is required as the salt of a different anion, then one anion may be replaced by aother by known methods, for example metathesis.

Insoluble azo dyestuffs useful as starting materials for the above process may be made by diazotising an aminoheterocyclic compound followed by coupling of the diazo compound with a suitable 8-aminoquinoline derivative.

Examples of compounds which can be used as diazo components include:
3-amino-1,2,4-triazole
3-amino-5-methyl-1,2,4-triazole
3-amino-5-ethyl-1,2,4-triazole
3-amino-5-propyl-1,2,4-triazole
3-amino-5-butyl-1,2,4-triazole
3-amino-5-phenyl-1,2,4-triazole
3-amino-5-(p-nitrophenyl)-1,2,4-triazole
3-amino-5-(m-tolyl)-1,2,4-triazole
3-amino-5-cyclohexyl-1,2,4-triazole
3-amino-5-(2-thienyl)-1,2,4-triazole
3-amino-5-benzyl-1,2,4-triazole
3-amino-5-(p-chlorophenyl)-1,2,4-triazole
3-amino-5-(p-methoxyphenyl)-1,2,4-triazole
3-amino-5-methylthio-1,2,4-triazole
3-amino-5-ethylthio-1,2,4-triazole
3-amino-5-propylthio-1,2,4-triazole
3-amino-5-butylthio-1,2,4-triazole
3-amino-5-benzylthio-1,2,4-triazole
3-amino-5-phenylthio-1,2,4-triazole
3-amino-5-methoxy-1,2,4-triazole
3-amino-5-ethoxy-1,2,4-triazole
3-amino-5-propoxy-1,2,4-triazole
3-amino-5-butoxy-1,2,4-triazole
3-amino-5-phenoxy-1,2,4-triazole
3-amino-5-methoxycarbonyl-1,2,4-triazole (+ higher ester homologues)
1-benzyl-3-aminocarbonyl-1,2,4-triazole
1-methyl-3-amino-1,2,4-triazole
1-ethyl-3-amino-1,2,4-triazole
1-benzyl-3-amino-1,2,4-triazole
1-benzyl-5-methyl-3-amino-1,2,4-triazole
1-phenyl-3-amino-1,2,4-triazole
1,5-dimethyl-3-amino-1,2,4-triazole
1-methyl-5-benzyl-3-amino-1,2,4-triazole
1-ethyl-5-phenyl-3-amino-1,2,4-triazole
1,5-diphenyl-3-amino-1,2,4-triazole
1-phenyl-5-methyl-3-amino-1,2,4-triazole
1-benzyl-5-phenyl-3-amino-1,2,4-triazole
1,5-dibenzyl-3-amino-1,2,4-triazole
2-amino-6-methoxybenzthiazole
2-amino-6-chlorobenzthiazole
2-amino-6-thiocyanatobenzthiazole 4-aminopyridine
3-aminopyridine
5-aminoisothiazole
4-aminobenztriazole
4-aminobenzimidazole
7-aminobenzthiazole
2-aminothiazole
3-aminopyrazole
3-aminoindazole.

Examples of 8-aminnoquinolines which may be used as coupling components include:
8-aminoquinoline
8-N-methylaminoquinoline
8-N-n-propylaminoquinoline
8-N-n-hexylaminoquinoline
8-N-isopropylamineoquinoline
8-N-n-butylaminoquinoline
8-N,N-diethylaminoquinoline
8-N-β-cyanoethylaminoquinoline
8-N-(β-cyanoethyl)-N-ethylaminoquinoline
8-N-benzylaminoquinoline
8-anilinoquinoline
8-N-cetylaminoquinoline
8-N-cyclohexylaminoquinoline
8-amino-2,4-dimethylquinoline
8-N-ethylamino-2,4-dimethylquinoline
8-amino-2-methylquinoline
8-N-ethylamino-2-methylquinoline
8-N-ethylaminoquinoline
8-amino-2-chloroquinoline
8-N-dethylamino-2-chloriquinoline Dyestuffs of the invention wherein A is an aromatic carbocyclic or heterocyclic group having a pendant cationic group are preferably manufactured by diazotising a compound of the formula:

wherein $A^2$ is a aromatic carbocyclic or heterocyclic group having a pendant cationic group and coupling the diazo compound with a compound of the formula:

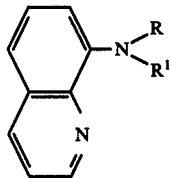

wherein R and $R^1$ are as hereinbefore defined and the quinoline ring may be further substituted.

Amines of formula $[A^2 - NH_2]^\oplus X^\ominus$ which may be used as diazo components include:
(4-aminophenylsulphonylamino)ethylpyridinium chloride,
(4-amino-3-chlorophenylsulphonylamino)ethyl-pyridinium chloride,
(4-amino-2,5-dichlorophenylsulphonylamino)ethyl-pyridinium chloride,
(4-amino-3,5-dichlorophenylsulphonylamino)ethyl-pyridinium chloride,
4-aminophenacyltrimethylammonium chloride, (3-amino-4-methylphenacyl)-trimethylammonium chloride, (4-amino-2-chlorophenacyl)-trimethylammonium chloride, (4-amino-2,5-dimethylphenacyl)ammonium chloride,
(3-amino-4-methoxyphenacyl)-trimethylammonium chloride,
(4-aminophenylaminocarbonyl)-methylpyridinium chloride,
(4-aminophenylsulphonylamino)ethyltrimethylammonium chloride,
$N^1$-4-aminophenylcarbonylmethyl-N,N-dimethylhydrazinium chloride,
4-aminophenyloxyethylcarbonyloxy-ethylpyridinium chloride, m-aminophenyl-trimethylammonium chloride, 3-(4'-aminobenzoylamino)phenyl-trimethylammonium chloride, 3-(4'-aminophenylsulphonylamino)phenyl-trimethylammonium chloride, 4-aminophenylcarbonyloxyethyl-trimethylammonium chloride, 4-aminophenyl-methyltrimethylammonium chloride, 3-aminophenylmethyltrimethylammonium chloride, 3-aminophenyl-methylpyridinium chloride, (3-aminophenylsulphonylamino)ethylpyridinium chloride,
3-aminophenacyl-trimethylammonium chloride, 3-aminophenyl-methylpyridinium chloride, 3-aminophenylaminocarbonyl-methylpyridinium chloride, 3-aminophenylsulphonylaminoethyl-trimethylammonium chloride, N'-3-aminophenylsulphonylaminoethyl-N,N-dimethylhydrazinium chloride, N'-3-aminophenacyl-N,N-dimethylhydrazinium chloride, 3-aminophenylmethyl-trimethylammonium chloride, N'-3-aminophenylmethyl-N,N-dimethylhydrazinium chloride, 3-aminophenylaminocarbonylmethyl trimothylammonium chloride, N'-3-aminophenylaminocarbonylmethyl-N,N-dimethylhydrazinium chloride, (4-aminophenylsulphonylamino)-ethyl-2-methylpyridinium chloride, 4-aminophenylaminocarbonylmethyl-diethylsulphonium chloride, 4-aminophenyloxyethyl-methylethylsulphonium chloride, 4-aminophenylthioethyltrimethylammonium chloride, 4-aminophenacyl-isothiouronium chloride,
3-(β-4-aminophenoxyethylcarbonyl)-1-methylpyridinium chloride,
N'-4-aminophenylcarbamoylmethylidene-N,N,N-trimethylhydrazinium chloride,
8-Aminoquinoline-5-ylcarbonylmethyltrimethylammonium chloride,
2-aminothiophene-5-ylcarbonylmethyltrimethylammonium chloride,
2-aminofuran-5-ylcarbonylmethyltrimethylammonium chloride,
2-aminopyrrole-5-ylcarbonylmethyltrimethylammonium chloride,
3-aminocarbazol-6-ylcarbonylmethyltrimethylammonium chloride.

These amines may be obtained by well-known methods, for example, by reacting a nitroamine which contains an anion-forming group which is capable of being quaternised by a suitable quaternising agent, followed by reduction of the nitro group to an amino group or by replacing the nitro group by an acylamino group and obtaining the required amine by hydrolysis instead of reduction.

As coupling components there may be used, for example the 8-aminoquinolines listed hereinbefore.

The dyestuffs of the present invention may be used to colour synthetic polymeric materials by application from an aqueous bath. The present dyestuffs give valuable bright shades of high tinctorial strength.

In particular the dyestuffs of the invention aree valuable for dyeing polyacrylonitrile materials and may be applied to polyacrylonitrile materials from acid, neutral or slightly alkaline dyebaths (i.e. pH from 3-8) at temperatures between 40°–120° C or by printing techniques using thickened print pastes. Bright red to violet dyeings of excellent fastness properties to washing, perspiration, and steam-pleating and light are obtained.

The dyestuffs of the present invention may be used for the colouration of polymeric textile materials, particularly polymers and copolymers of acrylonitrile, by the wet transfer printing process. In this process a support, such as paper, is printed with an ink containing a dyestuff, the printed support is placed in contact with a textile material and the whole then subjected to heat pressure under humid or wet conditions and the dyestuff transferred to the textile material.

The invention is illustrated but not limited by the following Examples in which all parts and percentages are by weight unless otherwise stated. Where parts by volume are given, the relation of weight to volume is the relation of gram to millilitre.

EXAMPLE 1

2.84 parts of 3-amino-1,2,4-triazole is dissolved in 12 parts of water containing 1.8 parts of sulphuric acid (Specific gravity 1.84). 12 parts of glacial acetic acid is added and the solution cooled to 5°–10° C. 6.4 parts of 5N sodium nitrite solution is then added and the mixture stirred at 5°–10° C for ½ hour. Excess nitrous acid is removed by the addition of a few drops of 20% w/w sulphamic acid solution. This solution is added to 5.16 parts of 8-ethylaminoquinoline in 300 parts of water and 36 parts of hydrochloric acid (36° Tw.). Sodium acetate is then added until the product starts to separate. After stirring for 2 hours at room temperature the product is filtered off, washed with water then dried at 60° C to yield 5.8 parts of a red solid.

1.94 parts of this solid is stirred at 75°–80° C with 0.67 part of magnesium oxide and 30 parts of glacial acetic acid. 3.53 parts of dimethyl sulphate is added and the mixture is then stirred at 75°–80° C for 2 hours. The mixture is drowned into 150 parts of water then screened through hyflo supercel. The hyflo cake is then washed with water and salt is added to the combined liquors to make its concentration 15% w/v. 5 parts of 100% w/v zinc chloride solution is also added and after stirring for 30 mins the precipitate is filtered off. The product is purified by dissolving in 100 parts of water then filtering through hyflo. The hyflo cake is washed with 50 part portions of water and the product re-precipitated by the addition to the combined liquors of 1 part of 100% zinc chloride solution and 10% salt. The product is dried at 80° C to yield a dyestuff which dyes acrylic fibres in bright bluish-red shades of excellent fastness to light, washing and steam-pleating.

The 8-ethylaminoquinoline is made by reacting 8-hydroxyquinoline with ethylamine and aqueous sodium bisulphate, i.e. by a Bucherer reaction.

Further dyes made by methods similar to that described above in example one are shown in the following table; the second column describes the heterocyclic diazo component, the third column describes the 8-aminoquinoline coupling component and the final column describes the shade imparted to acrylic fibres by the water-soluble dyestuff obtained after alkylation with dimethyl sulphate.

| Example | Diazo component | Coupling component | Shade on acrylic fibres |
|---|---|---|---|
| 2 | 3-Amino-1,2,4-triazole | 8-aminoquinoline | red |
| 3 | " | 8-n-Propylaminoquinoline | bluish-red |
| 4 | " | 8-Cyclohexylaminoquinoline | " |
| 5 | " | 8-n-Hexylaminoquinoline | " |
| 6 | " | 8-iso-Propylaminoquinoline | " |
| 7 | " | 8-n-butylaminoquinoline | |
| 8 | " | 8-Diethylaminoquinoline | violet |
| 9 | " | 8-$\beta$-Cyanoethylamino-quinoline | red |
| 10 | " | 8-N-$\beta$-Cyanoethyl-N-ethylaminoquinoline | bluish-red |
| 11 | " | 8-Benzylaminoquinoline | bluish-red |
| 12 | " | 8-Anilinoquinoline | violet |
| 13 | 6-Methoxy-2-amino-benzthiazole | 8-Ethylaminoquinoline | blue |
| 14 | " | 8-Aminoquinoline | reddish-blue |
| 15 | " | 8-Anilinoquinoline | greenish-blue |
| 16 | 2-Aminothiazole | " | blue |
| 17 | " | 8-Ethylaminoquinoline | violet |
| 18 | " | 8-Cyclohexylaminoquinoline | " |
| 19 | " | 8-[$\beta$-Cyanoethylamino]-quinoline | reddish-violet |
| 20 | " | 8-Aminoquinoline | bluish-red |
| 21 | " | 8-[N-$\beta$-Cyanoethyl-N-ethyl]-aminoquinoline | violet |
| 22 | " | 8-Amino-2,4-dimethyl-quinoline | red |
| 23 | " | 8-[$\beta$-Cyanoethylamino]2,4-dimethylquinoline | bluish-red |
| 24 | 6-Methoxy-2-aminobenz-thiazole | 8-Methylaminoquinoline | blue |
| 25 | 6-Methoxy-2-aminobenz-thiazole | 8-[N-$\beta$-Cyanoethyl-N-ethylamino]quinoline | blue |
| 26 | 3-Amino-1,2,4-triazole | 8-[$\beta$-Cyanoethylamino]-2,4-dimethylquinoline | bluish-red |
| 27 | " | 8-Ethylamino-2,4-dimethylquinoline | " |

EXAMPLE 28

4.60 parts of trimethyl-4-aminophenylmethylammonium chloride in 100 parts of water and 6 parts of 36° Tw. hydrochloric acid is treated at 0°–5° C with 11 parts of 2N sodium nitrite. The solution is then stirred at 0°–5° C for 30 mins and excess nitrous acid is removed by the addition of a few drops of 10% sulphamic acid solution.

This diazo solution was added to a mixture of 5.4 parts of 8-ethylaminoquinoline, 200 parts of water and 4 parts of 36° Tw. hydrochloric acid whilst maintaining the temperature at less than 5° C. 20 parts of sodium acetate is then added and the mixture is stirred at room temperature overnight. The product is filtered off and washed with 10% brine then dried at 60° C to yield a dark brown powder which dyes acrylic fibres in rubine shades with good fastness properties.

Further bluish-red dyestuffs made by the method of Example 28 are described in the following table. The second column describes the diazo component used and the third column the coupling component.

| Example | Diazo Component | Coupling Component |
|---|---|---|
| 29 | Trimethyl-3-aminophenyl-ammonium chloride | 8-m-Propylaminoquinoline |
| 30 | 2-(4'-Aminophenylsulphonyl-amino)ethylpyridinium chloride | " |
| 31 | " | 8-Ethylaminoquinoline |
| 32 | 2-(4'-Amino-2',5'-dichloro-phenylsulphonylamino)ethyl-pyridinium | " |
| 33 | " | 8-Cyclohexylamino-quinoline |
| 34 | 4-Aminophenacyltrimethyl-ammonium chloride | " |
| 35 | " | 8-Ethylaminoquinoline |
| 36 | 4-Aminophenylaminocarbonyl-methylpyridinium chloride | " |
| 37 | 3-(4'-Aminobenzoylamino)-phenyltrimethyltrimethyl-ammonium chloride | " |
| 38 | " | 8-Butylamino-2-methyl-quinoline |
| 39 | 3-Aminophenylmethyl-trimethylammonium chloride | " |
| 40 | 3-Aminophenacyltrimethyl-ammonium chloride | 8-Ethylaminoquinoline |
| 41 | " | 8-Propylaminoquinoline |
| 42 | N-3-Aminophenylmethyl-N,N-dimethylhydrazinium chloride | " |
| 43 | " | 8-Nonylaminoquinoline |
| 44 | 4-Aminophenylsulphonyl-aminoethyl-2-methyl-pyridinium chloride | 8-Nonylaminoquinoline |
| 45 | " | 8-Ethylaminoquinoline |
| 46 | 4-Aminophenyloxyethyl-methylethylsulphonium chloride | " |
| 47 | " | 8-Cyclohexylamino-quinoline |
| 48 | " | 8-β-Cyanoethylamino-quinoline |
| 49 | " | 8-Anilinoquinoline |
| 50 | " | 8-Amino-2,4-dimethyl-quinoline |
| 51 | " | 8-N-ethylamino-2-chloro-quinoline |
| 52 | 4-Aminophenylthioethyl-trimethylammonium chloride | " |
| 53 | " | 8-Ethylaminoquinoline |
| 54 | " | 8-isoPropylaminoquinoline |
| 55 | 4-Aminophenacylisothio uronium chloride | " |
| 56 | " | 8-n-Hexylaminoquinoline |
| 57 | 3-(β-aminophenoxyethyl-carbonyl)-1-methyl-pyridinium chloride | " |
| 58 | " | 8-Ethylaminoquinoline |
| 59 | 8-Aminoquinoline-5-yl-carbonylmethyltrimethyl-ammonium chloride | " |
| 60 | " | 8-Cyclohexylaminoquinoline |
| 61 | 8-Aminofuran-5-ylcarbonyl-methyltrimethylammonium chloride | " |
| 62 | 8-Aminofuran-5-ylcarbonyl methyltrimethylammonium chloride | 8-Ethylaminoquinoline |
| 63 | 3-Aminocarbazol-6-yl-carbonylmethyltrimethyl-ammonium chloride | " |
| 64 | " | 8-Butylaminoquinoline |

Further dyestuffs made by methods similar to that described in Example 1 are shown in the following table. The second column describes the heterocyclic diazo component, the third column describes the 8-aminoquinoline coupling component, the fourth column indicates the group introduced by the quaternising agent and the final column describes the shade imparted to polyacrylonitrile fibres by the water soluble dyestuffs.

| Ex. | Diazo Component | Coupling Component | Quaternary group introduced | Shade on acrylic fibres |
|---|---|---|---|---|
| 65 | 3-Aminopyridine | 8-Ethylaminoquinoline | CH₃— | red |
| 66 | " | " | —CH₂CH₂OH | " |
| 67 | " | 8-Cyclohexylamino-quinoline | " | " |
| 68 | 4-Aminoisothiazole | " | | violet |
| 69 | " | 8-Ethylaminoquinoline | " | " |
| 70 | " | " | —C₂H₅ | " |
| 71 | 4-Aminobenz-1,2,3-triazole | " | CH₃— | red |
| 72 | 4-Aminobenzimidazole | " | " | " |
| 73 | 4-Amino-2-methyl-benzimidazole | " | —CH₂CH₂CONH₂ | " |
| 74 | 4-Amino-2-methyl-benzimidazole | 8-Propylamino-quinoline | —CH₃ | red |
| 75 | 2-Aminopyridine | 8-Ethylaminoquinoline | " | " |
| 76 | 3-Aminoindazole | " | —CH₂CH₂OH | violet |
| 77 | 3-Amino-5-phenyl-pyrazole | " | —CH₃ | red |
| 78 | 6-Methoxy-2-amino-benzthiazole | 8-(N,N-diethylamino)-quinoline | " | greenish-yellow |
| 79 | " | 8-Amino-2,4-dimethyl-quinoline | " | mid-blue |
| 80 | 3-Amino-5-methyl-1,2,4-triazole | 8-Ethylaminoquinoline | " | bluish-red |
| 81 | 3-Amino-5-phenyl-1,2,4-triazole | " | " | " |
| 82 | " | 8-Anilinoquinoline | —CH₂CH₂CN | violet |
| 83 | " | 8-[β-cyanoethyl]aniline | " | bluish-red |
| 84 | 3-Amino-5-cyclohexyl-1,2,4-triazole | 8-Ethylaminoquinoline | —CH₃ | " |
| 85 | 3-Amino-5-ethoxy-1,2,4-triazole | " | " | " |
| 86 | 3-Amino-5-methoxycarbonyl-1,2,4-triazole | " | " | red |
| 87 | 1-Ethyl-3-amino-1,2,4-triazole | " | " | bluish-red |
| 88 | " | 8-Anilonoquinoline | —CH₂CH₂OH | violet |
| 89 | 1,5-Dimethyl-3-amino-1,2,4-triazole | 8-Ethylaminoquinoline | —CH₃ | bluish-red |
| 90 | 1-Ethyl-5-phenyl-3-amino-1,2,4-triazole | " | " | violet |
| 91 | 1,5-Diphenyl-3-amino-1,2,4-triazole | 8-Ethylaminoquinoline | —CH₂CH₂OH | violet |
| 92 | 3-Amino-1,2,4-triazole | 8-(4'-methoxyanilino)-quinoline | —CH₃ | reddish-blue |
| 93 | 2-Amino-6-chlorobenz-thiazole | 8-Ethylaminoquinoline | —CH₃ | blue |
| 94 | 4-Aminopyridine | " | " | bluish-red |
| 95 | " | 8-Anilinoquinoline | —CH₂CH₂OH | violet |
| 96 | 5-Aminoisothiazole | 8-Ethylaminoquinoline | —CH₃ | blue |
| 97 | " | 8-Cyclohexylamino-quinoline | —CH₂CH₂OH | blue |
| 98 | " | " | —CH₃ | " |
| 99 | 7-Aminobenzthiazole | " | —CH₂CH₂OH | violet |
| 100 | 3-Aminopyrazole | " | —CH₃ | red |
| 101 | 3-Amino-1,2,4-triazole | 8-Ethylaminoquinoline | —CH₂CH₂Cl | bluish-red |
| 102 | " | " | —CH₂CH₂OCOCH₃ | bluish-red |
| 103 | " | " | —CH₂—CH=CH₂ | " |
| 104 | " | " | —CH₂—⌬ | |
| 105 | " | " | —CH₂—CH₂—⌬ | " |
| 106 | " | " | —CH₂—CH₂CONH₂ | " |
| 107 | " | 8-Butylaminoquinoline | —CH₂CH₂OH | " |
| 108 | " | " | —CH₂CH₂CN | " |

We claim:
1. Azo dyestuff of the formula:

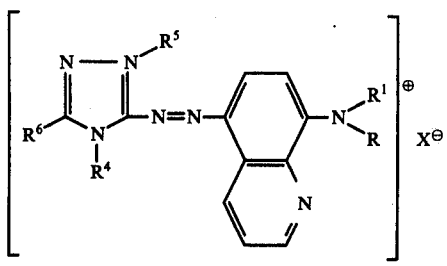

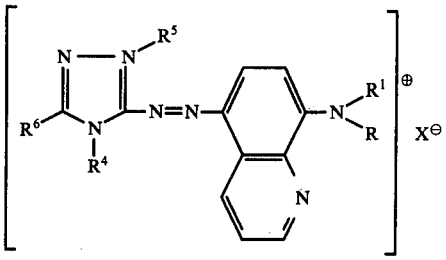

wherein X is an anion, R is an alkyl group of from 1 to 6 carbon atoms and $R^1$ is hydrogen, $R^4$ and $R^5$ are optionally substituted alkyl or aralkyl radicals and $R^6$ is hydrogen or optionally substituted aryl, alkyl or aralkyl group.

2. An azo dyestuff of the formula:

wherein X is an anion, $R^1$ is hydrogen, R is alkyl of from 1 to 6 carbon atoms, $R^4$ and $R^5$ are selected from the group consisting of methyl, ethyl, propyl, butyl, 2-chloroethyl, 2-bromoethyl, 2-acetoxyethyl, allyl, benzyl, cyclohexyl, 2-phenylethyl, 2-carbamoylethyl, 2-carbamoyl-2-methylethyl, methoxyethyl, methylcarbonylethyl, 2-hydroxyethyl and 2-cyanoethyl and $R^6$ is selected from the group consisting of hydrogen, methyl, ethyl, benzyl, phenyl, p-nitrophenyl, m-tolyl, cyclohexyl, p-chlorophenyl, p-methoxyphenyl, methylthio, methoxy, methoxycarbonyl and aminocarbonyl.

* * * * *